United States Patent [19]

Emory, Jr.

[11] 4,173,091
[45] Nov. 6, 1979

[54] DOWN RIGGER LINE RELEASE

[75] Inventor: John E. Emory, Jr., Traverse City, Mich.

[73] Assignee: Big Jon, Inc., Traverse City, Mich.

[21] Appl. No.: 827,891

[22] Filed: Aug. 26, 1977

[51] Int. Cl.² .............................................. A01K 91/00
[52] U.S. Cl. .................................................. 43/43.12
[58] Field of Search ............................... 43/43.1, 43.12

[56] References Cited

U.S. PATENT DOCUMENTS

| | | | |
|---|---|---|---|
| 3,643,370 | 2/1972 | Cook et al. | 43/43.12 X |
| 3,930,330 | 1/1976 | Black | 43/43.12 X |
| 4,069,611 | 1/1978 | Dusich et al. | 413/43.12 |

Primary Examiner—James G. Smith
Attorney, Agent, or Firm—Price, Heneveld, Huizenga & Cooper

[57] ABSTRACT

A down rigger line release is disclosed for releasably holding a fishing line relative to a down rigger line. The release includes a body defining an upwardly, opening groove which is angled from the horizontal. The fishing line is wrapped around a tapered release pin pivotally mounted at one end within the groove. Due to the taper of the pin, the fishing line will be wedged between the pin and the sidewalls of the groove when the pin is disposed within the groove. A resiliently mounted member is carried by the body and exerts an adjustable force against the free end of the tapered release pin.

14 Claims, 5 Drawing Figures

DOWN RIGGER LINE RELEASE

BACKGROUND OF THE INVENTION

The present invention relates to down rigger and/or outrigger apparatus of the type used in maintaining the depth of a lure or bait attached to a fishing line during trolling. More particularly, the present invention relates to a unique line release for use with such down rigger or outrigger apparatus.

Heretofore, various systems have been proposed for maintaining the depth of the lure or bait attached to a fishing line during trolling type fishing operations. Typical of these systems are the down rigger devices. These devices include a weighted line to which a fishing line is attached. The down rigger weight is lowered to the desired depth thereby carrying the fishing line downwardly and the lure or bait trails the down rigger line in a generally horizontal manner. Such devices insure that the lure is maintained at the desired fishing depth.

Various mechanisms are known in the art for releasing the fishing line from the down rigger system when the lure or bait is struck by a fish. Such devices permit the line to be reeled in free from interference with the weighted down rigger line. Examples of such prior release mechanisms may be found in U.S. Pat. No. 3,659,370, entitled TROLLING DEVICE AND SYSTEM, and issued on May 2, 1972 to C. P. Ritter; U.S. Pat. No. 3,816,954, entitled FREE LINE DOWN RIGGER RELEASE and issued on June 18, 1974 to K. E. Bissonette; U.S. Pat. No. 3,861,074, entitled LIGHTWEIGHT, DEEP-TROLLING RIG FOR FISHING TACKLE and issued on Jan. 21, 1975 to W. P. Wood; U.S. Pat. No. 3,874,110, entitled DOWNRIGGER LINE RELEASE and issued on Apr. 1, 1975 to R. D. Larson; U.S. Pat. No. 3,905,148, entitled OUTRIGGER FISHING LINE SYSTEM WITH LINE RELEASE and issued on Sept. 16, 1975 to P. L. Naone et al; U.S. Pat. No. 3,930,330, entitled OUTRIGGER FISHING LINE RELEASE CLIP and issued on Jan. 6, 1976 to A. D. Black; U.S. Pat. No. 3,974,589, entitled FISHING LINE RETENTION DEVICE and issued on Aug. 17, 1976 to W. Henze et al; and U.S. Pat. No. 4,012,863, entitled DOWNRIGGER RELEASE and issued on Mar. 22, 1977 to J. Lori.

All the devices disclosed in the aforementioned U.S. Patents include provision for releasably securing a fishing line to a portion of a down rigger or outrigger apparatus. For example, U.S. Pat. No. 3,930,330 discloses a release including a body defining a vertical channel adjacent one edge through which the down rigger line is attached. Opposite the vertical channel, the body defines a generally vertical groove within which is partially disposed a pivoted arm. The free end of the arm is received within a resilient, bifurcated structure defined by the body.

SUMMARY OF THE INVENTION

In accordance with the present invention, a relatively simple, easily manufactured, and effective down rigger release is provided whereby the fishing pole may be torqued down or bowed by reeling in the line during trolling operations without activating the release, wherein the release is activated when a fish strikes and wherein the mangitude of the force exerted on the line by a striking fish to release the line may be adjusted. Essentially, the unique down rigger release in accordance with the present invention includes a member defining an upwardly opening groove positioned at an acute angle downwardly from horizontal. The member is securable to the down rigger or outrigger line. A release means is pivotally secured within the groove and is movable from a first position within the groove to a second position extending upwardly from the groove. When in the first position, a fishing line wrapped around the release means is wedged against the sidwalls of the groove permitting a vertical force to be exerted on the fishing line without activating the release means. Provision is made for releasably retaining the free end of the pivoted member within the groove and for varying the required magnitude of the horizontal force exerted on the fishing line by a striking fish to activate the release mechanism and shift the member to the second position.

In narrower aspects of the invention, the release means includes a tapered, release pin pivoted at the end of greatest diameter within the groove adjacent the upper end of the groove.

DETAILED DESCRIPTION OF THE PREFERRED EMBODIMENT

Figure 1:
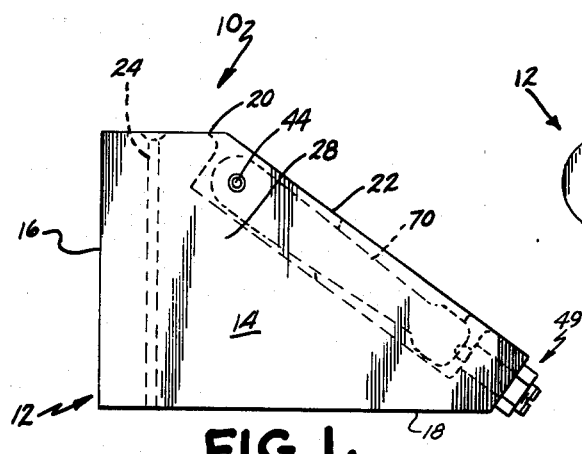
FIG. 1 is a side, elevational view of the unique release in accordance with the present invention.

The preferred embodiment of the unique line release in accordance with the present invention is illustrated in the drawings and generally designated 10. As clearly seen in FIGS. 1 and 2, the release includes a generally triangular or rudder shaped body 12. The body 12 includes sidewalls 14, a front, vertical wall 16, a horizontal, lower or bottom wall 18 and a top wall 20. The top wall 20 includes a surface 22 angled with respect to horizontal and connecting the lower wall 18 with the upper wall 16. In general appearance, the body 10 has the shape of a twice truncated, right angle triangle. The portion of the body immediately adjacent the front wall 12 defines an elongated, vertical passage or channel 24. The channel passes through the entire length of the body and, as will be explained below, permits attachment of the body 12 to a down rigger or outrigger line.

The body 12 which is in effect a housing defines an elongated groove 16 opening through the top surface portion 22. The groove 26 extends longitudinally substantially the entire length of the surface 22 and is bounded by upper side portions 28, 30 of the sidewalls 14. The groove is also defined by a bottom wall portion 32 and upper and lower end wall portions 34, 36, respectively. The groove extends at an acute angle downwardly from a horizontal plane extending perpendicular to the vertical front wall 12.

Pivotally mounted within the groove 26 is an elongated release arm or pin 40. The pin 40 is disposed within the groove so that an upper end 42 is pivotally secured to the sidewalls of the groove by a pivot pin 44 which extends perpendicular to the side walls. As is apparent from FIGS. 1, 2 and 3, the pin 40 is generally tapered so as to be conical in shape with the taper running from the upper end 42 to a headed, lower end 46.

The area of the pin adjacent the end 42 is generally cylindrical while the central portion 43 is conical in shape and the headed portion 46 is cylindrical in shape. The maximum diameter of the pin adjacent the portion 42 is substantially equal to but slightly less than the width of the groove 26 or the distance between the inner surfaces of the sidewall portions 28 and 30. This permits the pin to assume a first position disposed entirely within the groove.

Figure 2:
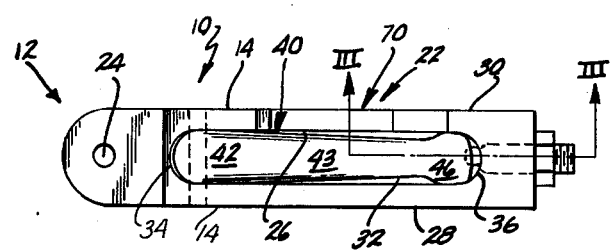
FIG. 2 is a top, plan view of the release.
Figure 3:
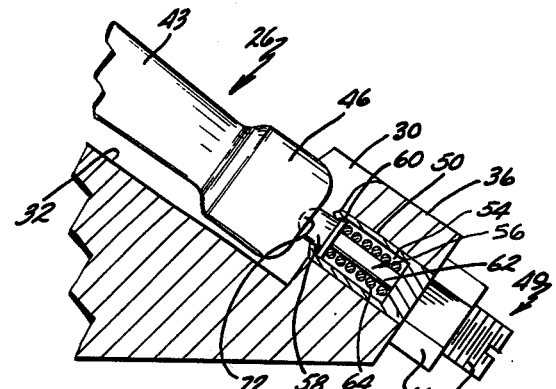
FIG. 3 is a fragmentary, sectional view taken generally along line III—III of FIG. 2.

Means 49 are provided for engaging the headed portion 46 of the pin to releasably retain the pin within the groove in a detent fashion. As seen in FIGS. 2 and 3, the body 12 defines a through bore 50 extending from the lower end of the body through the end wall 36 of the groove 26. The bore is preferably threaded so as to receive a set screw 52. As seen in FIG. 3, the end of the set screw adjacent the groove 26 is provided with a bore 54 within which is disposed a spring biased plunger 56. The plunger 56 includes a head 58 extending out of the bore 54, a flanged portion 60 adjacent the end of the plunger 58 and a shaft portion 62 around which is disposed a coil spring 64. The end of the set screw adjacent the open end of the bore 54 may be crimped downwardly after insertion of the plunger within the bore to retain the plunger in place when the release arm 40 is pivoted out of the groove.

Also, as is apparent from FIG. 3, the free end of the pin 40 is provided with a centrally positioned, outwardly opening, concave shaped depression 72. The plunger head 58 is dimensioned to be received within the depression or recess 72. As a result, the plunger assembly 56 engages the free end of the release arm or pin 40 in a detent, snap-action type fashion. A lock nut 66 is threadably disposed on the end of the set screw 52 to maintain the screw in the desired, adjusted position.

As seen in FIGS. 1, 2 and 3, the body preferably defines a thumb cutout portion 70 through one of the sidewalls 14. The thumb cutout portion permits access to the pin 40 for securement of the fishing line thereto.

The body 12 may be fabricated from aluminum, plastic, brass or any other material of sufficient strength to withstand the forces imposed in use. In a presently existing embodiment of the release, the body is fabricated from aluminum and the pin 40 is fabricated from a brass roll pin. The plunger 56 of the variable pressure mechanism is fabricated from nylon. The pin 40 has a maximum diameter of approximately 0.375 inches, a minimum diameter of approximately 0.254 inches and a total length of 2.25 inches. The vertical face, edge or wall 16 of the body 12 has a length of 2 inches and the horizontal surface, edge or lower wall 18 has a length of 2.8 inches. The angled top 22 is positioned at an angle a of 35° below horizontal and has a length of 2.7 inches. The groove 26 has a length of 2.4 inches, a width of approximately 0.40 inches and a depth of approximately 0.475 inches. The upper end, cylindrical portion of the pin 40 has an axial length of approximately 0.70 inches. The conical portion 43 has a length of approximately 1.25 inches and the headed portion 46 has a length of approximately 0.30 inches.

OPERATION

Figure 4:
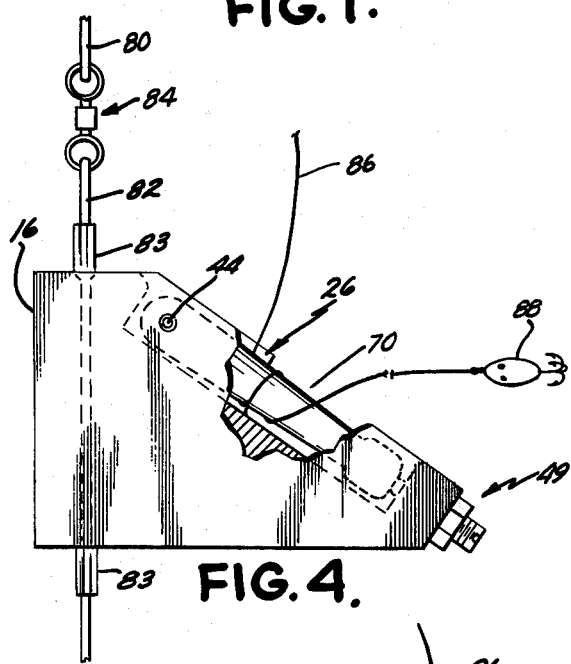
FIG. 4 is a side, elevational view showing the manner of attachment of the fishing line to the release.

As seen in FIG. 4, the release 10 may be secured to a down rigger line 80 by a wire leader 82 passing through the bore, passage or channel 24 defined adjacent the forward face 16 of the body 12. It is preferred that the leader 82 be connected to the down rigger line 80 through swivels 84. The swivels help prevent rotation of the body 12 upon rotation or swiveling of the down rigger line 80. Also, it is preferred that the bore 24 have a diameter greater than the diameter of the wire leader 82. In the alternative, the down rigger line 80 could pass directly through the bore 24 and the body held in place by crimps 83. By running the down rigger line adjacent the forward or front face 16 of the body 12 and by fabricating the body in a generally rudder shape, stable tracking of the release during rolling operations is assured.

Figure 5:
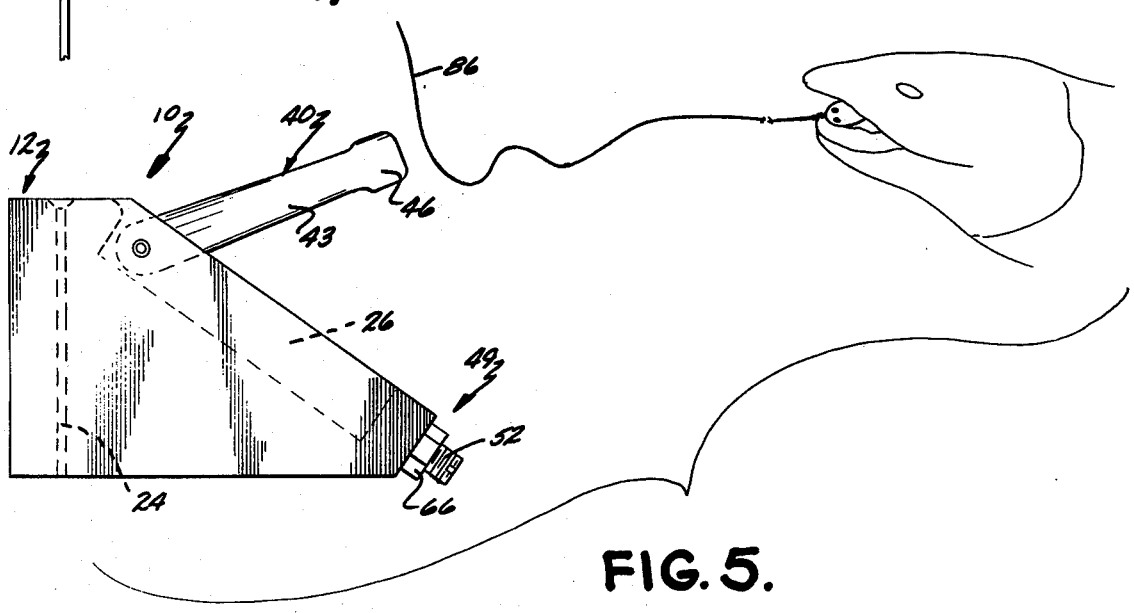
FIG. 5 is a side, elevational view illustrating the manner of operation of the release upon a strike by a fish.

Initially, the release pin 40 is pivoted to its second or release position illustrated in FIG. 5 and the fishing line 86 is wrapped around the pin several times as shown in FIG. 4. The release pin is then pivoted downwardly to its first position where it is held in a detent fashion by the plunger 56. Since the pin 40 is tapered with respect to the sidewalls of the groove 26 and the line is wrapped around the pin, the line will be wedged between the pin and the relatively converging inner or side walls of the groove when in use. This wedging and the acutely angled position of the pin relative to the horizontal permits a vertical force to be exerted on the line 86 without activating the release. This permits the fishing pole to be torqued down or bowed in use. When a fish strikes the lure 88 with a sufficient force depending upon the adjustment of the set screw 52, the free end 46 of the arm 40 will release from engagement with the plunger 56 permitting the arm 40 to pivot upwardly to the position shown in FIG. 5 thereby releasing the line 86 from the device 10. When the pole tip is torqued down and the line 86 is tensioned, a fish striking the lure releases the arm 40 and the pole tip will pop or snap upwardly, signal the strike and set the hook.

In order to release the fishing line 86 from the device 10 from the boat and while the line is submerged, a user need merely move the fishing pole rearwardly over the water so that the line 86 assumes a nonvertical and rearwardly directed angle with respect to the pin 40. The user then pulls hard upwardly on the line creating a rearwardly directed force permitting the detented end of the pin to snap loose and release the line. In order to vary the release pressure or force that is necessary to release the pin, the user need merely rotate the set screw 52 towards or away from the free end of the pin 40.

Thus, the down rigger release in accordance with the present invention provides a simple, easily and relatively inexpensively manufactured device for readily releasing the fishing line from a down rigger or outrigger system upon a strike by a fish. The detent action and the spring loading of the plunger 56 within the adjustable set screw 52 permits a reasonable variance of the release pressure or force so that the fishing line will not be released from the device upon encountering marine growth or due to normal water drag forces imposed on the line and the lure or bait.

In view of the above description, those of ordinary skill in the art will undoubtedly envision various modifications which would not depart from the inventive concepts disclosed herein. Therefore, it is expressly intended that the above description should be considered as that of the preferred embodiment only. The true spirit and scope of the present invention will be determined by reference to the appended claims.

The embodiments of the invention in which an exclusive property or privilege is claimed are defined as follows:

1. A down rigger line release for releasably holding a fishing line relative to a down rigger line, said release comprising:
a body attachable to the down rigger line and defining an upwardly opening groove having vertically oriented, spaced sidewalls, said groove being angled downwardly at an acute angle from horizontal;
a tapered release pin having a tapered portion and being pivotally mounted at one end within said groove about an axis perpendicular to said sidewalls and around the tapered portion of which the fishing line may be wrapped so as to normally be wedged between said release pin and said body groove sidewalls, said pin being pivoted about an axis perpendicular to the sidewalls of said groove; and
means carried by said body for exerting an adjustable force against the free end of said tapered release pin to maintain the release pin within the groove in a detent fashion.

2. A down rigger line release as defined by claim 1 wherein said body is generally triangular in shape and includes a vertical edge, a lower horizontal edge and a generally angled edge connecting said lower edge to said vertical edge.

3. A down rigger line release as defined by claim 2 wherein said groove opens outwardly and upwardly from said body along said angled edge.

4. A down rigger line release as defined by claim 3 wherein said tapered release pin is generally conical in shape and the wide end of which is pivoted to said body within and adjacent the upper end of said groove, said pin having a maximum diameter substantially equal to but slightly less than the width of said groove.

5. A down rigger line release for releasably holding a fishing line relative to a down rigger line, said release comprising:
a body attachable to the down rigger line and defining an upwardly opening groove, said groove being angled from horizontal;
a tapered release pin pivotally mounted within said groove and around which the fishing line may be wrapped so as to normally be wedged between said release pin and said body; and
means carried by said body for exerting an adjustable force against the free end of said tapered release pin to maintain the release pin within the groove in a detent fashion, said body being generally triangular in shape and including a vertical edge, a lower horizontal edge and a generally angled edge connecting said lower edge to said vertical edge, said groove opening outwardly from said body along said angled edge, said tapered release pin being generally conical in shape and the wide end of which being pivoted to said body within and adjacent the upper end of said groove, said pin having a maximum diameter substantially equal to but slightly less than the width of said groove, and said force exerting means comprising:
a threaded member threaded to said body and extending through one end of said groove, said member defining a bore at the end extending into said groove;
a plunger disposed within said bore; and
means for resiliently biasing said plunger outwardly and into engagement with the free end of said tapered pin whereby adjustment of said threaded member relative to said body varies the force which must be exerted on said pin by said fishing line to release said pin.

6. A down rigger line release pin as defined by claim 5 wherein said body defines a thumb cutout opening through a side of said groove to permit access to said pin.

7. A down rigger line release pin as defined by claim 6 wherein said angled edge of said body is angled from horizontal at an angle of approximately 35°.

8. An apparatus for releasably holding a fishing line relative to a down rigger line, said apparatus comprising:
a rudder shaped body having spaced parallel sides, a vertical front surface, a generally horizontal bottom surface and a top surface extending from the top of said front surface to said lower surface, said top surface having an angled portion extending at an acute angle upwardly relative to said bottom surface and towards said front surface, said body having an elongated groove of generally constant width and depth opening outwardly through said top surface angled portion, said groove including spaced parallel sidewalls;
a tapered release pin of generally conical shape having the end of greatest diameter pivoted to said body within said groove about an axis perpendicular to said sidwalls, said pin being positionable within said groove; and
pressure means for exerting an adjustable pressure against the free end of said release pin when said pin is within said groove, whereby a line may be wrapped around the tapered release pin and will be wedged between the pin and the groove sidewalls.

9. An apparatus as defined by claim 8 wherein said release pin includes a cylindrical portion, a tapered, conical portion and a head portion, said pin being pivoted to said body at said cylindrical portion.

10. An apparatus for releasably holding a fishing line relative to a down rigger line, said apparatus comprising:
a rudder shaped body having spaced parallel sides, a vertical front surface, a generally horizontal bottom surface and a top surface extending from the top of said front surface to said lower surface, said body having an elongated groove of generally constant width and depth opening outwardly through said top surface;
a tapered release pin of generally conical shape having the end of greatest diameter pivoted to said body within said groove, said pin being positionable within said groove; and
pressure means for exerting an adjustable pressure against the free end of said release pin when said pin is within said groove, said release pin including a cylindrical portion, a tapered, conical portion and a headed portion, said pin being pivoted to said body at said cylindrical portion, said body defining a threaded bore opening into said groove and said pressure means comprising:
a set screw having a bore opening through one end, said screw being disposed in said threaded bore;
a plastic plunger disposed in said set screw bore and extending into said groove and contacting the headed portion of said pin; and
a spring disposed within said set screw bore and biasing said plunger against said headed portion.

11. An apparatus for releasing a fishing line from a down rigger line, comprising:
- a housing having a bottom wall and spaced, parallel sidwalls joined by a pair of end walls and having an open top to thereby define a groove;
- means for attaching said housing to a down rigger line so that said housing groove is positioned at an acute angle downwardly from a horizontal plane perpendicular to the down rigger line and said housing groove opening upwardly; and
- release means pivotally secured to said housing about an axis perpendicular to the down rigger line and having a member movable from a first position within said housing groove to a second position extending upwardly from said housing groove for releasably holding a fishing line wrapped therearound, said member wedging said fishing line against a sidewall of said housing groove when in said first position and when a vertical force is exerted on said fishing line, said member moving to said second position releasing said fishing line when a horizontal force is exerted on said fishing line.

12. An apparatus as defined by claim 11 wherein said release means further comprises:
- said member being an elongated pin pivotally secured between the sidewalls of said housing at one end and extending substantially the entire axial length of said groove; and
- resilient means engaging said pin at its nonpivoted end for holding said pin in said first position yet releasing said pin to move to said second position upon exertion of a horizontal force on said fishing line greater than the normal drag force exerted thereon.

13. An apparatus as defined by claim 12 wherein said pin is tapered from said pivoted end to said free end, the maximum diameter of said pin being substantially equal but less than the width of said groove.

14. An apparatus as defined by claim 13 wherein said housing further includes a rudder shaped portion having a forward, vertical face and said means for attaching said housing to the down rigger line comprises said rudder shaped portion defining an elongated passage therethrough adjacent said vertical face.

* * * * *

UNITED STATES PATENT AND TRADEMARK OFFICE
CERTIFICATE OF CORRECTION

PATENT NO. : 4,173,091
DATED : November 6, 1979
INVENTOR(S) : John E. Emory, Jr.

It is certified that error appears in the above-identified patent and that said Letters Patent are hereby corrected as shown below:

Column 1, Line 65;

"mangitude" should be --magnitude--

Column 2, Line 8;

"sidwalls" should be --sidewalls--

Column 2, Line 52;

"16" should be --26--

Column 4, Line 9;

"rolling" should be --trolling--

Column 7, Claim 11, Line 4;

"sidwalls" should be --sidewalls--

Signed and Sealed this

Tenth Day of June 1980

[SEAL]

Attest:

SIDNEY A. DIAMOND

Attesting Officer          Commissioner of Patents and Trademarks